United States Patent [19]

Goldenberg et al.

[11] 4,215,373
[45] Jul. 29, 1980

[54] TELEVISION SET PROJECTOR

[76] Inventors: Max Goldenberg; David A. Goldenberg, both of 1215 S. Fairlawn Ave., Evansville, Ind. 47714

[21] Appl. No.: 952,688

[22] Filed: Oct. 19, 1978

[51] Int. Cl.² .............................................. H04N 5/74
[52] U.S. Cl. .................... 358/237; 358/254; 358/60; 312/7 TY
[58] Field of Search ............... 358/231, 255, 254, 60, 358/237, 250; 353/47, 74, 75, 76, 97, 78, 98, 100, 122; 312/7 TY

[56] References Cited

U.S. PATENT DOCUMENTS

| | | | |
|---|---|---|---|
| 3,820,885 | 6/1974 | Miller | 353/98 |
| 3,882,269 | 5/1975 | Michaus | 358/86 |
| 4,051,535 | 9/1977 | Inglis | 358/237 |
| 4,074,322 | 2/1978 | Cammilleri | 358/237 |

*Primary Examiner*—John C. Martin
*Assistant Examiner*—Edward L. Coles

*Attorney, Agent, or Firm*—Woodard, Weikart, Emhardt & Naughton

[57] ABSTRACT

A device for projecting and magnifying a picture image from a television set. A first housing is removably mounted to the television set to receive the picture image from the television screen. A second housing is slidably mounted to the first housing and cooperatively with the first housing forms a passage through which the picture image passes to a lens mounted at the end of the second housing. The first housing includes a light-absorbent inner surface whereas the second housing includes a light-reflective inner surface. A gear and rack device is provided for slidably adjusting the second housing relative to the first housing and controlling the ratio of the light-reflective surface to the light-absorbent surface. A barrel-configured lens is slidably mounted to the second housing for focusing of the picture image on a remotely located viewing surface which may be positioned at any one of a number of different distances from the television set and lens.

8 Claims, 6 Drawing Figures

U.S. Patent Jul. 29, 1980 Sheet 1 of 2 4,215,373
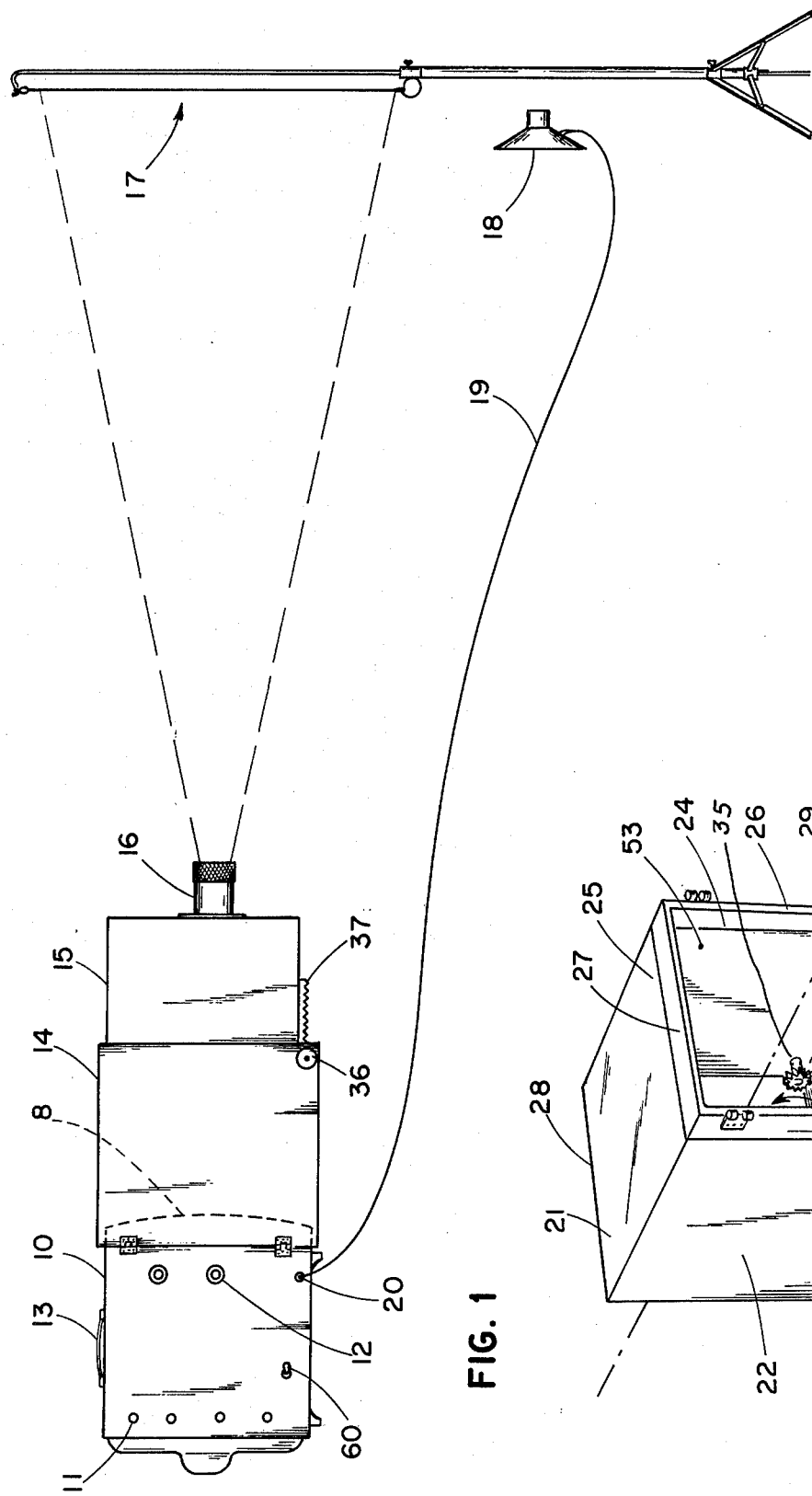

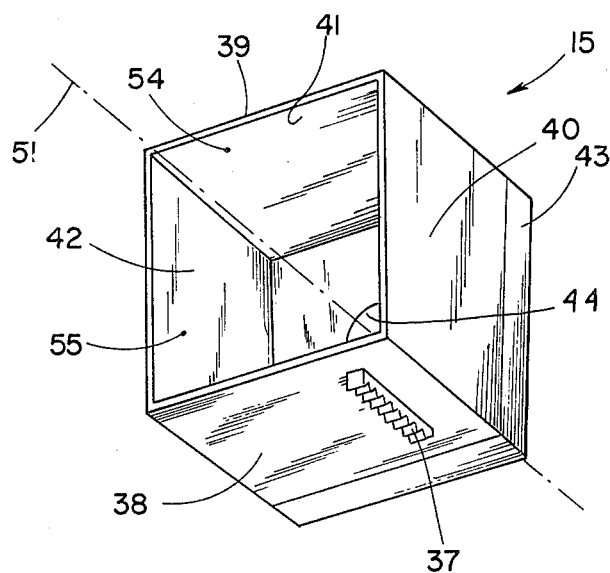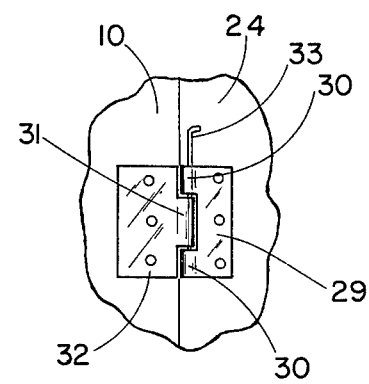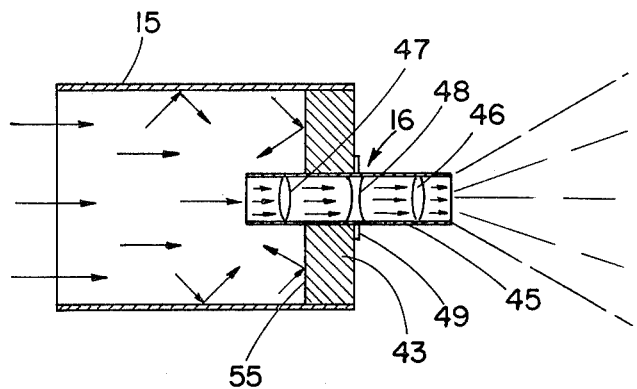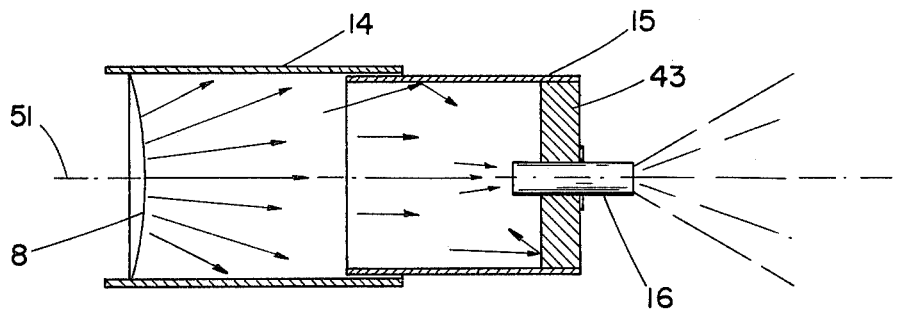

TELEVISION SET PROJECTOR

BACKGROUND OF THE INVENTION

This invention is in the field of devices for magnifying and projecting a picture image from a television set. Several devices have heretofore been designed and marketed for magnifying and projecting a picture image from a cathode ray tube of a television set onto a remotely located screen. Many of the early devices were very expensive and thus could be justified only for commercial use. More recently, devices have been marketed costing several thousand dollars and designed for use either in a small business or residential setting. For example, a projection color television system marketed by Advent Corporation of Cambridge, Massachusetts projects three separate color pictures simultaneously onto a concave configured screen which then displays the composite color picture. The distance between the viewing surface and the projector is particularly critical in the Advent system. Such a system is not designed to be added onto an existing television set but instead includes a built-in receiver.

Other devices for magnifying and projecting a television picture image include different types of housings attachable to a television set with different types of lenses and mirrors provided in the housing for the projection and magnification. A kit is sold by the Macrocoma Company which necessitates positioning the television set in an inverted position with the picture image then being directed through a right angle housing and reflected off a mirror within the housing through a flat lens movable to and from the housing. The brightness of the projected image on the viewing surface is critical in order to provide a satisfactory picture to the viewer. Mirrors do not reflect 100% of the image received and thus considerably reduce the brightness of the projected image. As a result, systems utilizing mirrors are particularly disadvantageous for color picture projection.

Convex and/or concave configured lenses are utilized in some television set projectors in lieu of the flat lens. For example, a device sold by Extron Ltd., 8833 Sunset Boulevard, West Hollywood, Calif. 90069, includes a straight housing mountable to a television set with an aperture provided at the opposite end of the housing to receive a barrel-configured lens including a pair of double convex lens between which is positioned a double concave lens. Such a barrel-type lens is manufactured by U.S. Precision Lens, 3997 McMann Road, Cincinnati, Ohio 45245, under the name "Beta-II-Lens."

A number of U.S. patents have been granted on a variety of devices for projecting a television picture image. For example, U.S. Pat. No. 4,051,535 issued to James M. Inglis includes a housing mountable to a television set having at the end opposite the television screen a flat lens through which the image is projected and magnified. Another approach is shown in U.S. Pat. No. 3,820,885 issued to Bennie S. Miller which uses a standard overhead projection unit to reflect and then magnify the picture image.

SUMMARY OF THE INVENTION

One embodiment of the present invention is a device for projecting and magnifying a picture image from a screen of a television set comprising a light-storage housing removably mountable to said television set, said housing having a proximal end portion extending continuously and peripherally around said screen to receive all light rays emitted by said screen and defining a first tunnel extending outwardly from said screen in a straight direction, a light-reflecting housing having a distal end portion and an inner end portion with said inner end portion slidably mounted to said storage housing and being aligned therewith, said reflecting housing defining a second tunnel extending in the same direction as said first tunnel with said first tunnel and second tunnel cooperatively forming an obstruction-free passage for light rays emitted from said screen in said straight direction, first means provided on said reflecting housing at said distal end portion and extending across said passage having an aperture to receive a lens and operable to allow a portion of light rays from said screen to pass through said aperture, and an image lens mounted on said means at said aperture to magnify and project light rays passing therethrough from said screen upon a forward viewing surface facing said lens and located remotely from said television set.

It is an object of the present invention to provide a new and improved device for projecting and magnifying a picture image from a screen of a television set.

Yet another object of the present invention is to provide a kit which may be mounted to a television set for projecting and magnifying a picture image therefrom.

A further object of the present invention is to provide a device mountable to a television set for the projection and magnification of the image from the screen with minimum distortion and maximum brightness.

Related objects and advantages of the present invention will be apparent from the following description.

BRIEF DESCRIPTION OF THE DRAWINGS

FIG. 1 is a side view of a television set equipped with the preferred embodiment of the present invention.

FIG. 2 is a perspective end view of the light storage housing 14 mountable directly to the television set shown in FIG. 1.

FIG. 3 is an end perspective view of the light-reflecting housing 15 mounted to the light-storage housing of FIG. 2.

FIG. 4 is a reduced cross-sectional view of the housing of FIG. 3 having a lens mounted thereto.

FIG. 5 is a cross-sectional view of the housings of FIGS. 2 and 4 mounted together.

FIG. 6 is an enlarged fragmentary view of one of the hinges used to mount the housing of FIG. 2 to the television set shown in FIG. 1.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a television set 10 with conventional controls 11 and 12. While the set shown in FIG. 1 is of portable construction including a handle 13, it is to be understood that the present invention may be used with television sets of both a portable and a permanent nature.

A light-storage housing 14 is mounted directly to the face of television set 10 and slidably receives a light-reflecting housing 15 in turn having a lens 16 mounted thereto for the projection and magnification of an image upon viewing surface 17. An audio speaker 18 is located adjacent viewing surface 17 and is connected by conventional wiring 19 to an audio output jack 20 located on the cabinet of set 10.

Light-storage housing 14 (FIG. 2) includes a top and bottom wall 21 and 23 joined together to a pair of side walls 22 and 24 forming an elongated box open at the opposite ends. End 25 includes a top and bottom flange 27 and side flanges 26 which extend continuously and peripherally around television set 10 so as to receive all of the light rays emitted by the cathode ray tube or screen 8 (FIG. 1) of the set. The opposite end 28 of housing 14 slidably receives the light-reflecting housing 15 shown in FIG. 3.

Mounted to side flanges 26 are a plurality of conventional hinges 29 for removably mounting the light-storage housing to television set 10. Hinge 29 (FIG. 6) includes top and bottom spaced apart cylindrical and hollow tubes 30 between which a complementary cylindrical and hollow tube 31 is positioned. Tube 31 is fixedly fastened to hinge 32 in turn fixedly fastened to the side wall of television set 10. A removable pin 33 is slidably received by tubes 30 and 31 so as to secure the housing 14 to set 10. A plurality of hinges are provided on the opposite side flanges to allow the housing to be removed in the event that it is desired to view the screen on set 10 in a conventional manner.

Gear 34 is fixedly mounted to rotatable axle 35 bearingly extending through side wall 24 with a handle 36 provided on the opposite end of axle 35 for turning gear 34. Gear 34 is in meshing engagement with a rack 37 fixedly mounted to the bottom wall 38 of housing 15 (FIG. 3). The inner end portion 39 of housing 15 is slidably received by the distal end portion 28 of housing 14 with rack 37 riding on gear 34. Thus, by turning handle 36, housing 15 may be slidably adjusted relative to housing 14 and moved to and from screen 8 of set 10. Housing 15 is provided with a pair of side walls 40 and 42 joined to top wall 41 and bottom wall 38 in an elongated box-like configuration. Housing 15 is aligned with housing 14 to allow the picture image from screen 8 to pass through housing 14 and then housing 15 to a lens 16 slidably mounted to the mounting plate 43 (FIG. 3) fixedly attached to the distal end of housing 15. Plate 43 extends across the passage formed by housing 15 and has an aperture 44 to receive lens 16.

Lens 16 is of conventional construction and includes a pair of spaced apart double convex lenses 46 and 47 fixedly mounted to a barrel-configured housing 45. A double concave lens 48 is positioned between lenses 46 and 47. Such a lens may be purchased from U.S. Precision Lens, 3997 McMann Road, Cincinnati, Ohio 45245, under the name "Beta-II-Lens" with lenses 46, 47 and 48 being produced from a plastic material. Such a lens is provided with a focal length of 12 inches f/1.9, a diameter of 6½ inches and surface area less than 35 square inches facing the viewing surface 17. Cylindrical housing 45 is slidably received in aperture 44 which is slightly larger than the diameter of housing 45. A reinforcing plate 49 is mounted to the outside surface of plate 43 surrounding aperture 44 to provide additional support for the mounting of lens 16. Lens 16 extends into the passage formed by housing 15.

Light-storage housing 14 when mounted to set 10 defines a first tunnel 50 (FIG. 2) extending outwardly from screen 8 in a straight direction. Housing 14 is constructed so as to prevent light from escaping through any seams existing between the walls of the housing. Tunnel 50 extends in a straight direction along longitudinal axis 51 which extends perpendicularly outward from screen 8. The inwardly facing surface of each wall 21–24 is light-absorbent thereby absorbing at least a portion of those light rays which are emitted from screen 8 in a direction other than in a direction aong axis 51. For example, inner surfaces 52 and 53, respectively, of walls 23 and 24 are light-absorbent being painted black along with the inner surface of walls 21 and 22. Axis 51 also extends centrally through housing 15 and aperture 44. Light-reflecting housing 15 includes a light-reflective inner surface provided on each wall 38, 39, 40 and 42. For example, inner surfaces 54 and 55 of walls 39 and 42 are light-reflective being painted white thereby reflecting light rays impinging thereon. Likewise, the inwardly facing surfaces of walls 38 and 40 are light reflective, being painted white.

As shown in FIG. 5, housing 14 defines a first tunnel along axis 51 which is aligned with a second tunnel defined by housing 15 along axis 51 and cooperatively forming a passage through which the light rays emitted by screen 8 pass to lens 16. The passage formed by housings 14 and 15 is completely free of obstructions for light rays emitted from screen 8 in the direction of axis 51 toward lens 16. Mirrors are completely absent from the passage formed by housings 14 and 15 allowing for a line of sight and distortion-free image from screen 8 to lens 16. The lens magnifies and projects the light rays passing therethrough onto a forward viewing surface facing lens 16 and located remotely from television set 10. While the viewing surface 17 (FIG. 1) is shown as a conventional portable movie screen, it is to be understood that a variety of viewing surfaces may be used including walls.

It has been determined that the area of light-absorbent surface as compared to the area of light-reflective surface is particularly critical when projecting and magnifying an image from a television set onto a viewing surface. In the event that the housing attached to the television set defining a tunnel through which the image passes includes all light-reflective surfaces, then the image projected onto the viewing screen will be washed out. On the other hand, if the passage through which the picture image passes from the television set to the lens is all light-absorbent, then the image projected on the viewing surface is too dark for proper viewing. As shown in FIG. 1, housing 15 is slidable into housing 14 thereby fixing the area of light-reflective surface within housing 15 while allowing for a variance of the amount of light-absorbent area within housing 14. For example, by sliding housing 15 in the most inward position within housing 14, the area of light-absorbent area present within the passage formed by housing 14 and 15 is less as compared to the amount of light-absorbent area present when housing 15 is positioned in the most outward position. On the other hand, the amount of light-reflective surface within the passage formed by housings 14 and 15 is constant regardless of the position of housing 15. Best results have been obtained when the ratio of light-absorbent inner surface provided by housing 14 to the area of light-reflective inner surface provided by housing 15 is approximately 1:1. In other words, knob 36 should be adjusted so as to position housing 15 within housing 14 at the appropriate location whereat the passage formed by housings 14 and 15 contains an equal amount of light-reflective surface and light-absorbent surface.

As shown in FIG. 5, the light rays emitted by screen 8 will be initially directed at a variety of different angles with some of the light rays impinging upon the light-absorbent surface of housing 14 and some of the light rays reflecting off of the light-reflective surface of housing 15. The inwardly facing surface 55 of plate 43 (FIG. 4) is provided with a light-reflective surface and should be taken into account and added to the light-reflective surface of the side walls and top and bottom walls of housing 15 when adjusting housing 15 relative to housing 14 so as to produce equal amounts of light-reflective and light-absorbent surfaces. Aperture 44 provided in plate 43 allows only a portion of the light rays from the screen to pass through plate 43 with the remaining rays reflecting off of surface 55 or other surfaces within housing 15. Surface 55 extends perpendicular relative to axis 51 with surface 55 extending around aperture 44 so as to block light rays from screen 8 except for a central column of light which extends through lens 16.

As previously mentioned, lens 16 is slidably adjusted relative to plate 43. Thus, the viewing surface 17 may be located at any one of a number of different distances from the television set with lens 16 being adjustable so as to provide a focused image upon the viewing surface. Lens 16 is adjusted by simply moving the lens further into or out of housing 15, depending upon the distance of the viewing surface from lens 16 until focusing is achieved. In one embodiment with the lens previously described available from U.S. Precision Lens, the optical axis of lens 16 extended along axis 51 and the lens was located within 20 inches of screen 8 and 15 feet of viewing surface 17.

A vertical polarity switch 60 is provided on the cabinet of television set 10. Switch 60 is connected to the yoke of the cathode ray tube and is provided with suitable wiring to reverse the vertical polarity thereby projecting a correct image on viewing surface 17 without the use of a mirror. In one embodiment, switch 60 was a single-pull, double-throw switch connected to the vertical winding of the yoke. By moving switch 60 in the opposite direction, the vertical windings are connected in the normal manner and are not reversed thereby allowing the television set to be viewed in the normal manner without housings 14 and 15 attached thereto.

It will be obvious from the above description that the present invention provides a new and improved device for projecting and magnifying a picture image from a screen of a television set. It will be further obvious from the above description that the present invention provides a device which may be mounted to a television set for magnifying and projecting a picture image therefrom without the use of mirrors and while allowing the television set to be located a plurality of different distances from the viewing surface.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device for projecting and magnifying a picture image from a screen of a television set comprising:
    a light-storage housing removably mountable to said television set, said housing having a proximal end portion extending continuously and peripherally around said screen to receive all light rays emitted by said screen and defining a first tunnel extending outwardly from said screen in a straight direction;
    a light-reflecting housing having a distal end portion and an inner end portion with said inner end portion slidably mounted to said storage housing and being aligned therewith, said reflecting housing defining a second tunnel extending in the same direction as said first tunnel with said first tunnel and said second tunnel cooperatively forming an obstruction-free passage for light rays emitted from said screen in said straight direction;
    first means provided on said reflecting housing at said distal end portion and extending across said passage having an aperture to receive a lens and operable to allow a portion of light rays from said screen to pass through said aperture; and
    an image lens mounted on said means at said aperture to magnify and project light rays pasing therethrough from said screen upon a forward viewing surface facing said lens and located remotely from said television set;
    said storage housing includes a light-absorbent inner surface extending around said first tunnel to absorb at least a portion of light rays emitted from said screen in a direction other than said straight direction;
    said reflecting housing includes a light-reflective inner surface extending around said second tunnel to reflect light rays through said lens.

2. The device of claim 1 and further comprising adjustment means associated with said storage housing and said reflecting housing being operable to control the ratio of the area of said light-absorbent inner surface to the area of said light-reflective inner surface present within said passage.

3. The device of claim 2 wherein said ratio is approximately 1:1.

4. The device of claim 2 wherein said light-absorbent inner surface is black and said light-reflective inner surface is white, said area of said light-reflective inner surface present in said passage is fixed whereas said area of said light-absorbent inner surface is variable by said adjustment means.

5. The device of claim 2 wherein:
    said lens includes a pair of spaced apart double convex lens, a double concave lens positioned therebetween and a barrel housing with said double convex lens and double concave lens fixedly mounted therein;
    said first means slidably receives and holds said barrel-shaped housing for movement of said image lens to and from said screen to allow the device to be located at any one of a number of different distances from said viewing surface with said lens providing a focused picture thereon.

6. The device of claim 2 wherein said adjustment means includes a rack and an engaged gear cooperatively operable to slidably adjust said reflecting housing relative to said storage housing.

7. The device of claim 6 wherein said image lens has a focal length of 12 inches, an outer surface area facing said viewing surface of less than 35 square inches, an optical axis extending in said straight direction, and is located within 20 inches of said screen and said viewing within 15 feet of said viewing surface.

8. A device for projecting and magnifying a picture image from a screen of a television set comprising:

a first housing removably mountable to said television set, said housing having a proximal end portion extending continuously and peripherally around said screen to receive all light rays emitted by said screen and defining a first tunnel extending outwardly from said screen in a straight direction;

a second housing having a distal end portion and an inner end portion with said inner end portion slidably mounted to said first housing and being aligned therewith, said second housing defining a second tunnel extending in the same direction as said first tunnel with said first tunnel and said second tunnel cooperatively forming an obstruction-free passage for light rays emitted from said screen in said straight direction;

first means provided on said second housing at said distal end portion and extending across said passage having an aperture to receive a lens and operable to allow a portion of light rays from said screen to pass through said aperture; and an image lens mounted on said means at said aperture to magnify and project light rays passing therethrough from said screen upon a forward viewing surface facing said lens and located remotely from said television set;

said first housing and said second housing including a light-reflective inner surface and a light-absorbent inner surface extending around and defining said obstruction-free passage, said light-reflective inner surface reflecting light rays from said screen with said light-absorbent inner surface absorbing at least a portion of light rays directed other than said straight direction, said first housing and said second housing being slidably adjustable to control the ratio of light-absorbent surface to light-reflective surface.

* * * * *